(12) United States Patent
Seliskar et al.

(10) Patent No.: US 10,184,045 B2
(45) Date of Patent: Jan. 22, 2019

(54) THERMOPLASTIC POLYOLEFIN WITH REDUCED GLOSS FOR NON-CARPETED FLOORING

(71) Applicant: Dow Global Technologies LLC, Midland, MI (US)

(72) Inventors: James T. Seliskar, Bay City, MI (US); James D. Oelberg, Saginaw, MI (US)

(73) Assignee: Dow Global Technologies LLC, Midland, MI (US)

(*) Notice: Subject to any disclaimer, the term of this patent is extended or adjusted under 35 U.S.C. 154(b) by 324 days.

(21) Appl. No.: 15/107,643

(22) PCT Filed: Feb. 17, 2015

(86) PCT No.: PCT/US2015/016085
§ 371 (c)(1),
(2) Date: Jun. 23, 2016

(87) PCT Pub. No.: WO2015/126797
PCT Pub. Date: Aug. 27, 2015

(65) Prior Publication Data
US 2018/0251630 A1    Sep. 6, 2018

Related U.S. Application Data

(60) Provisional application No. 61/943,530, filed on Feb. 24, 2014.

(51) Int. Cl.
| | |
|---|---|
| *C08L 23/16* | (2006.01) |
| *B60N 3/04* | (2006.01) |
| *C08F 10/02* | (2006.01) |
| *C08F 10/06* | (2006.01) |

(52) U.S. Cl.
CPC .............. *C08L 23/16* (2013.01); *B60N 3/04* (2013.01); *C08F 10/02* (2013.01); *C08F 10/06* (2013.01); *C08F 2500/08* (2013.01); *C08F 2500/17* (2013.01); *C08F 2800/20* (2013.01); *C08L 2205/03* (2013.01); *C08L 2207/064* (2013.01); *C08L 2207/07* (2013.01)

(58) Field of Classification Search
CPC ............... C08L 23/16; C08L 2205/03; C08L 2207/064; C08L 2207/07; B60N 3/04; C08F 10/02; C08F 10/06; C08F 2500/08; C08F 2500/17; C08F 2800/20
See application file for complete search history.

(56) References Cited

U.S. PATENT DOCUMENTS

| | | |
|---|---|---|
| 6,372,847 B1 | 4/2002 | Wouters |
| 6,680,361 B1 | 1/2004 | Cady et al. |
| 7,750,104 B2 | 7/2010 | Cady et al. |
| 8,304,496 B2 | 11/2012 | Weaver et al. |
| 8,431,651 B2 | 4/2013 | Jones et al. |
| 2004/0132935 A1* | 7/2004 | Arjunan et al. ......... C08F 10/00 526/160 |
| 2015/0111034 A1* | 4/2015 | Botros .................. C08F 255/02 428/355 EN |

* cited by examiner

*Primary Examiner* — Nathan M Nutter

(57) ABSTRACT

The present invention is directed to an elastomer composition comprising an ethylene/α-olefin/diene modified interpolymer, a very low density polyethylene component, and a propylene polymer component, wherein the propylene polymer component comprises at least one branched polypropylene. The inventive compositions are particularly suitable for fabricating thermoformed non-carpet automotive flooring.

8 Claims, No Drawings

THERMOPLASTIC POLYOLEFIN WITH REDUCED GLOSS FOR NON-CARPETED FLOORING

FIELD OF THE INVENTION

This invention relates to a thermoplastic polyolefin composition for non-carpet flooring applications comprising one or more linear ethylene polymer and/or substantially linear polymer, a polypropylene, and an ethylene propylene diene monomer rubber. Specifically, a thermoplastic polyolefin composition having a good balance of melt strength and elongation such that it is particularly suitable for sheet extrusion and subsequent thermoforming for use in truck and automobile non-carpet flooring applications having reduced gloss.

BACKGROUND OF THE INVENTION

Automobile manufactures require that non-carpeted flooring material have good abrasion resistance, scratch and mar resistance, low gloss, and grain definition, while being colorable, durable, and able to withstand large temperature changes without failure. In addition, automobile manufactures require that the flooring material has a low modulus (elasticity) for ease of installation into a vehicle.

Known non-carpeted flooring materials may be manufactured from blends of impact modified polypropylene and high melt strength polypropylene (partially crosslinked). The impact modified polypropylene creates flexibility to facilitate installation into a vehicle and contributes to low gloss, while the high melt strength polypropylene facilitates scratch and mar resistance, and provides adequate strength during a thermoforming process. However, these known flooring materials have a narrow window of temperature range for thermoforming. High crystallinity of the material leads to sharp drop-off in melt strength during the thermoforming process. In addition, these known flooring materials also significantly increase in gloss as forming temperatures are increased which does not meet automobile manufactures requirements.

Thermoplastic polyolefin (TPO) compositions for use in low gloss sheet that can maintain low gloss have been developed for reduced gloss automotive applications. TPO blends of one or more ethylene/α-olefin elastomers and one or more polypropylenes to make fabricated articles or products, e.g., instrument panels, door panels, and non-carpeted flooring are known. See, for example, U.S. Pat. Nos. 6,372,847; 6,680,361; 7,750,104; 8,304,496; and 8,431,651. These blends and products demonstrate many desirable qualities, e.g., good to superior melt strength and processability, moldability, impact and mar resistance, modulus, elasticity, and the like. However, for some applications, these TPO compositions are not well suited for thermoforming and/or the providing an acceptable gloss level to fabricated articles made therefrom.

It would be desirable to have an elastomer composition which can be thermoformed into non-carpeted flooring applications having improved abrasion resistance, reduced gloss, and low odor and emissions.

SUMMARY OF THE INVENTION

The present invention is such an elastomer composition. Said composition comprises a) an ethylene/α-olefin/diene modified interpolymer having a density of from 0.84 g/cc to 0.92 g/cc and a Mooney viscosity of equal to or greater than 50 ML (1+4) at 125° C. as determined according to ASTM D 1646 in an amount of from 40 to 60 parts by weight; b) a very low density ethylene polymer component having a density equal to or less than 0.89 g/cc in an amount of from 10 to 20 parts by weight; and c) a propylene polymer component comprises at least one branched polypropylene in an amount of from 20 to 30 parts by weight.

In one embodiment, the present invention is the above disclosed elastomer composition wherein the ethylene/α-olefin/diene modified interpolymer is 5-ethylidene-2-norbornene; 1,4-hexadiene; or 7-methyl-1,6-octadiene.

In one embodiment, the present invention is the above disclosed elastomer composition wherein the at least one branched polypropylene is a copolymer of propylene and an α-olefin, selected form ethylene, 1-butene, 1-pentene, 1-hexene, 1-heptene, or 1-octene, preferably the propylene polymer component is a mixture of branched polypropylene and unbranched polypropylene, and more preferably, the branched polypropylene is present in at least 50 weight percent based on the weight of the propylene polymer component.

In another embodiment, the present invention is a process to make an automotive non-carpeted flooring comprising the steps of: i) forming a sheet comprising an elastomer composition disclosed herein above and ii) thermoforming the sheet into an automotive non-carpeted flooring.

In another embodiment, the present invention is the process described herein above wherein the sheet is an AB coextruded sheet or an ABA coextruded sheet wherein the elastomer comprising composition is the A layer(s).

In another embodiment, the present invention is an article comprising the above disclosed elastomer composition, preferably an automotive non-carpeted flooring.

DETAILED DESCRIPTION OF THE INVENTION

The ethylene/α-olefin (EAO) component (a) of the elastomer composition of the present invention comprises at least one ethylene/α-olefin interpolymer, which optionally may contain a diene. For examples, see U.S. Pat. No. 8,304,496, which is incorporated herein in its entirety. "Interpolymer," as used herein, refers to a polymer having polymerized therein at least two monomers. It includes, for example, copolymers, terpolymers and tetrapolymers.

It particularly includes a polymer prepared by polymerizing ethylene with at least one comonomer, typically an alpha olefin (α-olefin) of 3 to 20 carbon atoms (C3-C20), more preferably 3 to 12 carbon atoms (C3-C12) and even more preferably 3 to 8 carbon atoms (C3-C8). Illustrative α-olefins include propylene, 1-butene, 1-pentene, 1-hexene, 4-methyl-1-pentene, 1-heptene, 1-octene, butadiene, and styrene. The α-olefin is desirably a C3-C10 α-olefin.

Illustrative polymers include ethylene/propylene (EP) copolymers, ethylene/butene (EB) copolymers, ethylene/octene (EO) copolymers, ethylene/α-olefin/diene modified (EAODM) interpolymers such as ethylene/propylene/diene modified (EPDM) interpolymers and ethylene/propylene/octene terpolymers. Preferred copolymers include EP, EB, ethylene/hexene-1 (EH) and EO polymers.

Preferably, the EAO used in the present invention is an ethylene/α-olefin/diene modified interpolymer. Suitable diene monomers include conjugated and nonconjugated dienes. A non-conjugated diolefin is conventionally used as a cure site for cross-linking. The nonconjugated diolefin can be a C6-C15 straight chain, branched chain or cyclic hydrocarbon diene. Illustrative nonconjugated dienes are straight chain acyclic dienes such as 1,4-hexadiene and 1,5-heptadiene; branched chain acyclic dienes such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,5-dimethyl-1,7-octadiene, 5,7-dimethyl-1,7-octadiene, 1,9-decadiene and mixed isomers of dihydromyrcene; single ring alicyclic dienes, such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes, such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene and 5-cyclohexylidene-2-norbornene. The diene is preferably a nonconjugated diene, selected from the group consisting of ENB, 1,4-hexadiene, 7-methyl-1,6-octadiene, more preferably, ENB.

Suitable conjugated dienes include 1,3-pentadiene, 1,3-butadiene, 2-methyl-1,3-butadiene, 4-methyl-1,3-pentadiene, or 1,3-cyclopentadiene. The EAODM diene monomer content, whether it comprise a conjugated diene, a nonconjugated diene or both, falls within the limits specified above for non-conjugated dienes.

Although preferred interpolymers are substantially free of any diene monomer that typically induces long chain branching (LCB), one may include such a monomer, if costs are acceptable and desirable interpolymer properties, such as processibility, tensile strength and elongation, do not degrade to an unacceptable level. Such diene monomers include dicyclopentadiene, NBD, methyl norbornadiene, vinyl norbornene, 1,6-octadiene, 1,7-octadiene, and 1,9-decadiene. When added, such monomers are typically added in an amount within a range from greater than zero to 3 weight percent, more preferably from greater than zero to 2 weight percent, based on interpolymer weight.

The EAO interpolymer(s) of this invention may comprise branched or unbranched ethylene/α-olefin interpolymers, or a blend of two or more branched and/or unbranched interpolymers. The presence or absence of branching in the ethylene/α-olefin interpolymers, and if branching is present, the amount of branching, can vary widely, and is largely dependent upon the thermoforming process, and the amount of branched polypropylene in the blend. Thermoforming processes using a male mold, e.g., a roller used to impart a pattern to a smooth sheet of plastic made from the blend, preferably form the plastic sheet from a composition of one or more medium branched to highly branched ethylene/α-olefin interpolymers and a branched polypropylene.

The nature of the ethylene/α-olefin (EAO) branching, if present, is not critical to the practice of this invention, and as such, it can vary to convenience. Preferably, the branching is LCB. The ability to incorporate LCB into polymer backbones has been known and practiced for many years. In U.S. Pat. No. 3,821,143, a 1,4-hexadiene was used as a branching monomer to prepare ethylene/propylene/diene (EPDM) polymers having LCB. Such branching agents are sometimes referred to as H branching agents. U.S. Pat. Nos. 6,300,451 and 6,372,847 also use various H type branching agents to prepare polymers having LCB. In U.S. Pat. No. 5,278,272, it was discovered that constrained geometry catalysts (CGC) have the ability to incorporate vinyl terminated macromonomers into the polymer backbone to form LCB polymers. Such branching is referred to as T type branching. Each of these patents (U.S. Pat. Nos. 3,821,143; 6,300,451; 6,372,847 and 5,278,272) is incorporated, herein, in its entirety, by reference.

The '272 patent teaches such CGC are unique in their ability to incorporate large unsaturated molecules into a polymer backbone. The amount of LCB that can be incorporated by these CGC is from 0.01 LCB/1000 carbon atoms to 3 LCB/1000 carbon atoms. There are various other methods that can be used to define the degree of LCB in a molecule. One such method is taught in U.S. Pat. No. 6,372,847. This method uses Mooney stress relaxation data to calculate a MLRA/MV ratio. MLRA is the Mooney Relaxation Area and MV is the Mooney viscosity of the polymer. Mooney viscosity is determined according to ASTM D 1646. The EAO interpolymers of the present invention have a Mooney viscosity equal to or greater than 50 ML (1+4) at 125° C., preferably equal to or greater than 60 ML (1+4) at 125° C., and more preferably equal to or greater than 70 ML (1+4) at 125° C.

Interpolymer viscosity is conveniently measured in poise (dyne-second/square centimeter (d-sec/cm$^2$)) at shear rates within a range of 0.1-100 radian per second (rad/sec) and at 190° C., under a nitrogen atmosphere, using a dynamic mechanical spectrometer (such as a RMS-800 or ARES from Rheometrics), under dynamic sweep made from 0.1 to 100 rad/sec. The viscosities at 0.1 rad/sec and 100 rad/sec may be represented, respectively, as $V_{0.1}$ and $V_{100}$ with a ratio of the two referred to as RR and expressed as $V_{0.1}/V_{100}$. PRR is calculated by the formula:

$$PRR = RR + [[3.82\text{-interpolymer Mooney Viscosity} (ML_{1+4} \text{ at } 125° \text{ C.})] \times 0.3].$$

In one embodiment of this invention, the EAO interpolymers have a PRR from 8 to 70, preferably from 12 to 60, more preferably from 15 to 55, and most preferably from 18 to 50. In another embodiment, the EAO interpolymers have a PRR from −6 to 70. All individual values and subranges from −6 to 70 and 8 to 70 (PRR values) are included herein and disclosed herein. Many current commercial EAO resins have levels of LCB that equate to a PRR value less than 3. As a point of reference, a PRR of 70 is equivalent to an MLRA/MV value of 7.6.

Preferably, the type of LCB in the interpolymers used in the practice of this invention is T-type branching, as opposed to H-type branching. T-type branching is typically obtained by copolymerization of ethylene or other alpha olefins with chain end unsaturated macromonomers in the presence of a constrained geometry catalyst (metallocene-type or single site catalyst) under the appropriate reactor conditions, such as those described in U.S. Pat. No. 6,680,361, incorporated herein in its entirety by reference. If extremely high levels of LCB are desired, H-type branching is the preferred method since T-type branching has a practical upper limit to the degree of LCB. As discussed in U.S. Pat. No. 6,680,361, as the level of T-type branching increases, the efficiency or throughput of the manufacturing process decreases significantly, until the point is reached where production becomes economically unviable. The T-type LCB polymers can be produced by constrained geometry catalysts without measurable gels, but with very high levels of T-type LCB. Because the macromonomer being incorporated into the growing polymer chain has only one reactive unsaturation site, the resulting polymer only contains side chains of varying lengths and at different intervals along the polymer backbone.

H-type branching is typically obtained by copolymerization of ethylene or other alpha olefins with a diene having two double bonds reactive with a nonmetallocene type of catalyst in the polymerization process. As the name implies, the diene attaches one polymer molecule to another polymer molecule through a diene bridge, the resulting polymer molecule resembling an H that might be described as more of a crosslink than a long chain branch. H-type branching is typically used when extremely high levels of branching are desired. If too much diene is used, the polymer molecule can form so much branching or crosslinking that the polymer molecule is no longer soluble in the reaction solvent (in a solution process), and consequently falls out of solution resulting in the formation of gel particles in the polymer. Additionally, use of H-type branching agents may deactivate metallocene catalysts and reduce catalyst efficiency. Thus, when H-type branching agents are used, the catalysts used are typically not metallocene catalysts. The catalysts used to prepare the H-type branched polymers in U.S. Pat. No. 6,372,847 (incorporated herein in its entirety by reference) are vanadium type catalysts.

Lai et al. describe T-type LCB polymers in U.S. Pat. No. 5,272,236 in which the degree of LCB is from 0.01 LCB/1000 carbon atoms to 3 LCB/1000 carbon atoms and the catalyst is a constrained geometry catalyst (metallocene-type or single site catalyst).

According to P. Doerpinghaus and D. Baird in the Journal of Rheology, 47(3), pp 717-736 May/June 2003, "Separating the Effects of Sparse Long-Chain Branching on Rheology from Those Due to Molecular Weight in Polyethylenes," free radical processes, such as those used to prepare low density polyethylene (LDPE), produce polymers having extremely high levels of LCB.

Suitable ethylene interpolymers include ENGAGE™ and NORDEL™ polymers available from The Dow Chemical Company, and VISTALON™ and EXACT™ polymers available from ExxonMobil Chemical Company, and TAFMER™ polymers available from Mitsui Chemical.

In another embodiment, the elastomer component comprises a coupled polymer prepared by heating an admixture containing (1) at least one elastomer comprising ethylene, and at least one comonomer, which is selected from alpha olefins having at least 3 carbon atoms, dienes and combinations, thereof, and (2) a coupling amount at least one poly(sulfonyl azide), to at least the decomposition temperature of the poly(sulfonyl azide), for a period sufficient for decomposition of at least about 80 weight percent of the poly(sulfonyl azide), and sufficient to result in a coupled polymer having a gel content of less than about 2 weight percent. Such polymers are described U.S. Pat. Nos. 6,376,623; 6,506,848 and 6,528,136; each incorporated herein in its entirety by reference.

The EAO interpolymers used in the practice of this invention typically have a 0.1 rad/sec shear viscosity (also known as low shear viscosity) greater than 100,000, preferably greater than 200,000. This shear viscosity is determined, by measuring the polymer viscosity, at a shear rate of 0.1 radian per second (rad/sec), at 190° C., under a nitrogen atmosphere, using a dynamic mechanical spectrometer, such as an RMS-800 or ARES from Rheometrics. Low shear viscosity is affected by the molecular weight (MW) of the polymer and its degree of LCB. The molecular weight is indirectly measured by melt strength. As a general rule, the greater the molecular weight of a polymer, the better the melt strength. However, when molecular weight becomes too great, the polymers become difficult to process. Incorporation of LCB into a polymer backbone improves the processability of high MW polymers. Thus, low shear viscosity (0.1 rad/sec) is a measure of the balance of MW and LCB in a polymer.

Melt strength (MS), as here used, is a maximum tensile force, in centiNewtons (cN), measured on a molten filament of a polymer melt extruded from a capillary rheometer die at a constant shear rate of 33 reciprocal seconds (sec.sup.-1), while the filament is being stretched by a pair of nip rollers that are accelerating the filament at a rate of 0.24 centimeters per second per second (cm/sec$^2$), from an initial speed of 1 cm/sec. The molten filament is preferably generated by heating 10 grams (g) of a polymer that is packed into a barrel of an Instron capillary rheometer, equilibrating the polymer at 190° C. for five minutes (min), and then extruding the polymer at a piston speed of 2.54 cm/min through a capillary die with a diameter of 0.21 cm and a length of 4.19 cm. The tensile force is preferably measured with a Goettfert Rheotens that is located, so that the nip rollers are 10 cm directly below a point at which the filament exits the capillary die.

The EAO interpolymers used in the practice of this invention typically have a melt strength of 5 cN or greater, preferably 6 cN or greater and more preferably 7 cN or greater or 8 cN or greater. In one embodiment, the melt strength is from 5 cN to 50 cN, preferably from 5 cN to 35 cN, and more preferably from 5 cN to 20 cN. All individual values and subranges from 5 cN to 50 cN are included herein and disclosed herein.

Preferably, the EAO interpolymers used in the practice of this invention have a molecular weight distribution (MWD) from 1.5 to 4.5, more preferably from 1.8 to 3.8 and most preferably from 2.0 to 3.4. All individual values and subranges from 1.5 to 4.5 are included herein and disclosed herein. Many of the EAO interpolymers suitable for use in the practice of this invention can be made by the process described in U.S. Pat. No. 6,680,361.

In another embodiment, the EAO interpolymer has a density from 0.84 to 0.92 g/cc, preferably from 0.85 to 0.89 g/cc, and more preferably from 0.85 to 0.88 g/cc. All individual values and subranges from 0.84 to 0.92 g/cc are included herein and disclosed herein.

In another embodiment, the EAO interpolymer has a melt index, I2 (190° C./2.16 kg) from 0.05 to 10 g/10 min, preferably from 0.1 to 5 g/10 min, and more preferably from 0.2 to 2 g/10 min, or 0.5 to 1 g/10 min. All individual values and subranges from 0.05 to 10 g/10 min are included herein and disclosed herein. In another embodiment, the elastomer component has a melt index, I2, of 2 g/10 min or less.

Preferably, the EAO component is present in the elastomer composition of the present invention in an amount equal to or less than 70 weight percent, preferably equal to or less than 60 weight percent based on the total weight of the elastomer composition.

Preferably, the EAO component is present in the elastomer composition of the present invention in an amount equal to or greater than 40 weight percent, preferably equal to or greater than 50 weight percent based on the total weight of the elastomer composition.

Component (b) in the elastomer composition of the present invention is a very low density polyethylene. The term "very low density polyethylene", or "VLDPE" is used herein to describe linear ethylene/α-olefin copolymer having densities of generally between about 0.86 and 0.915 grams/cubic centimeter (g/cc), more preferably between about 0.883 to 0.911 g/cc, more preferably less than 0.89 g/cc. "Ultra low density polyethylene" or ULDPE is also included in this term.

The VLDPE ethylene/α-olefin polymers used in the present invention can be prepared in conventional gas phase polymerization processes using Ziegler-type catalysts such as, for example, zirconium, titanium, and vanadium catalyst systems. The VLDPE polymers used in the present invention are not to be confused with the well known substantially linear ethylene polymers and/or linear ethylene polymers (S/LEP) which are polymerized using metallocene catalyst systems. The VLDPE useful for admixing with propylene polymers to prepare the thermoplastic elastomeric composition of the present invention are ethylene polymers which do not have homogeneous chain branching, but do have heterogeneous chain branching. Homogeneous branched ethylene/α-olefin polymers (S/LEP) and their difference from heterogeneous ethylene/α-olefin polymers (VLDPE) are well know and described in U.S. Pat. Nos. 6,184,290; 6,184,291; 6,218,470; 6,369,161; and 6,403,710, which are incorporated herein in their entirety.

Suitable VLDPE polymers are copolymers of ethylene and an α-olefin. Preferred VLDPE used herein, are high molecular weight polymers, generally rigid at room temperatures, but easily formable when heated. The α-olefin contained in the copolymer is selected from the group of propylene, 1-butene, 1-hexene, 1-octene and higher 1-olefins and is present at a concentration of at least 5 percent by weight, preferably 10 percent or more by weight. and more preferably 20 percent or more by weight.

The VLDPE ethylene/α-olefin copolymers have a preferred melt flow rate (MFR), sometimes referred to as melt index (MI), determined in accordance with ASTM D 1238 (Conditions: 190° C. under a load of 2.16 kilograms, (190° C./2.16 kg)), of about 0.05 to 5.0 gram per 10 minutes (g/10 min). Preferably the MFR of the VLDPE used in the compositions of the present invention is equal to or greater than about 0.05 g/10 min, more preferably equal to or greater than about 0.12 g/10 min, and more preferably equal to or greater than about 0.15 g/10 min. Preferably the MFR of the VLDPE used in the compositions of the present invention is equal to or less than about 5 g/10 min, more preferably equal to or less than about 2 g/10 min, more preferably equal to or less than about 1 g/10 min, and more preferably equal to or less than about 0.5 g/10 min.

The VLDPE used in the elastomer composition of the present invention has a density equal to or less than 0.915 g/cc, preferably equal to or less than 0.911 g/cc, and more preferably equal to or less than 0.89 g/cc. The VLDPE used in the elastomer composition of the present invention has a density equal to or greater than 0.86 g/cc, more preferably equal to or greater than 0.883 g/cc and even more preferably equal to or greater than 0.886 g/cc.

Preferred VLDPE polymers are characterized by high molecular weight (i.e. relatively low melt index), broad molecular weight distribution (i.e. relatively high flow rate ratio), and relatively low crystallinity. They are further characterized as having glass transition temperatures between about −52° C. to −39° C., Shore A Hardness of from about 77 to 95, a peak melting point range of from between 114° C. to 119° C., and a flexural modulus of from about 30 to 1500 MPa.

VLDPE suitable for the present invention have a melt tan delta equal to or greater than 0.7, preferably equal to or greater than 0.8 and more preferably equal to or greater than 0.9, as measured by parallel plate rheometer at 0.1 radians per second (rad/sec), 180° C., and 10 percent strain. VLDPE suitable for the present invention have a melt tan delta equal to or less than 8, preferably equal to or less than 5, more preferably equal to or less than 2.5 as measured by parallel plate rheometer at 0.1 rad/sec, 180° C., and 10 percent strain.

In one embodiment, the VLDPE component suitable for use in the present invention has an extensional viscosity, as determined on compression molded samples using an ARES rheometer with an EVF extensional attachment at 190° C. and 1.0 sec$^{-1}$ strain rate of equal to or greater than 200,000 Pa-s, more preferably equal to or greater than 300,000 Pa-s, and most preferably equal to or greater than 400,000 Pa-s as determined at a Hencky Strain of 2.5 cm/cm.

Preferably, the VLDPE component is present in the elastomer composition in an amount equal to or greater than 5 weight percent and preferably equal to or greater than 10 weight percent based on the total weight of the elastomer composition.

Preferably, the VLDPE component is present in the elastomer composition in an amount equal to or less than 30 weight percent and preferably equal to or less than 20 weight percent based on the total weight of the elastomer composition.

The propylene polymer component (c) of the elastomer composition of the present invention comprises at least one branched propylene homopolymer or at least one branched propylene interpolymer. Other suitable propylene-based polymers include branched copolymers of propylene with at least one α-olefin; or a blend of a branched homopolymer and/or a branched copolymer; and/or a nucleated homopolymer, a nucleated copolymer or a nucleated blend of a branched homopolymer and a branched copolymer.

The propylene polymer component may be a mixture of branched polypropylene and unbranched polypropylene wherein the branched polypropylene is present in an amount of at least 10 weight percent based on the weight of the propylene polymer component, preferably at least 20 percent, more preferably at least 30 percent, more preferably at least 40 percent, more preferably at least 50 percent, more preferably at least 60 percent, more preferably at least 70 percent, more preferably at least 80 percent, and most preferably at least 90 percent by weight based on the weight of the propylene polymer component.

The branched polypropylene polymer component of this invention can also comprise a polypropylene impact copolymer, which has been branched and/or rheology modified via azide coupling, to provide a branched and/or coupled polypropylene impact copolymer. Polypropylene impact copolymers can be prepared as described in WO 01/58970, incorporated herein in its entirety by reference. The '970 reference describes reactor produced propylene impact copolymers containing a propylene homopolymer or copolymer and a propylene copolymer containing 20 percent to 70 percent by weight ethylene, butene, hexane and/or octene comonomer.

Suitable branched polypropylenes also include branched and/or coupled polypropylene formed by radiation, such as e-beam or gamma radiation, with or without the presence of a co-agent. Such branching reactions are typically done under an inert atmosphere.

Other suitable polypropylene polymers include coupled polymers, as described in U.S. Pat. No. 6,552,129, incorporated herein in its entirety by reference. As described in U.S. Pat. No. 6,552,129, a poly(sulfonyl azide) coupled polymer is formed by the following steps: (a) forming a first admixture of a first polymer and a poly(sulfonyl azide); (b) then forming a second admixture of the first admixture with a second amount of at least one second polymer; and (c) heating the second admixture at least to the decomposition temperature of the coupling agent for a time sufficient to result in coupling of polymer chains. Additional propylene polymers may be formed from the reaction product or blend product at least one ethylene-based elastomer, a coupling amount of at least one poly(sulfonyl azide) and a propylene-based polymer.

As here used, "branched polypropylene," "branched propylene homopolymer," "branched copolymer of propylene and one or more α-olefins," or similar term, means a polypropylene containing one or more H-type or T-type branching, a good discussion of H-type and T-type branching can be found in U.S. Pat. No. 8,304,496, incorporated herein its entirety. Briefly, T-type branching is typically obtained by copolymerization of ethylene or other α-olefins with chain end unsaturated macromonomers in the presence of a constrained geometry catalyst (metallocene-type or single site catalyst) under the appropriate reactor conditions, such as those described in WO 00/26268 (US equivalent U.S. Pat. No. 6,680,361, incorporated herein in its entirety by reference). H-type branching is typically obtained by copolymerization of ethylene or other α-olefins with a diene having two double bonds reactive with a nonmetallocene type of catalyst in the polymerization process. As the name implies, the diene attaches one polymer molecule to another polymer molecule through a diene bridge, the resulting polymer molecule resembling an H that might be described as more of a crosslink than a long chain branch. H-type branching is typically used when extremely high levels of branching are desired. When H-type branching agents are used, the catalysts used are typically not metallocene catalysts. The catalysts used to prepare the H-type branched polymers in U.S. Pat. No. 6,372,847 (incorporated herein in its entirety by reference) are vanadium type catalysts. Lai et al. describe T-type long chain branching (LCB) polymers in U.S. Pat. No. 5,272,236 in which the degree of LCB is from 0.01 LCB/1000 carbon atoms to 3 LCB/1000 carbon atoms and the catalyst is a constrained geometry catalyst (metallocene-type or single site catalyst).

Isotactic polypropylene homopolymers or copolymers having LCB are exemplary of T-type branched polypropylenes. Branched polypropylenes having H-type branching can be produced using reactive extrusion, as described in U.S. Pat. Nos. 6,472,473 and 6,841,620, or irradiation as described in U.S. Pat. No. 5,514,761. Each of these three patents is incorporated herein, in its entirety, by reference.

Suitable branched polypropylenes also include polymers containing polyethylene branches incorporated into the polypropylene backbone, as described in U.S. Pat. No. 6,750,307, incorporated herein by reference. Here a branched olefin copolymer having an isotactic polypropylene backbone contains polyethylene branches, and, optionally, one or more comonomers. Typically, the total comonomer content of the branched olefin copolymer is from 0 to 20 mole percent. Also, the mass ratio of the isotactic polypropylene to the polyethylene typically ranges from 99.9:0.1 to 50:50. Such branched propylene copolymers may be prepared, as described in U.S. Pat. No. 6,750,307, by the following steps: a) copolymerizing ethylene, optionally with one or more copolymerizable monomers, in a polymerization reaction under conditions sufficient to form copolymer having greater than 40% chain end-group unsaturation; b) copolymerizing the product of a) with propylene and, optionally, one or more copolymerizable monomers, in a polymerization reactor under suitable polypropylene polymerization conditions using a chiral, stereorigid transition metal catalyst capable of producing isotactic polypropylene; and c) recovering a branched olefin copolymer.

The α-olefin in the branched propylene copolymer is preferably ethylene, 1-butene, 1-pentene, 1-hexene, 1-heptene, 1-octene, or 4-methyl-l-pentene, with ethylene being more preferred. The α-olefin in the propylene copolymer is preferably ethylene. The copolymer may be a random copolymer or a block copolymer or a blend of a random copolymer and a block copolymer.

The propylene component of the polymer blend desirably has a MFR (230° C./2.16 kg weight) from 0.1 to 150 g/10 min, preferably from 0.3 to 60 g/10 min, more preferably from 0.4 to 40 g/10 min, even more preferably from 0.5 to 25 g/10 min, more preferably from 1 to 20 g/10 min, and most preferably from 2 to 15 g/10 min. All individual values and subranges from 0.1 to 150 g/10 min are included herein and disclosed herein. This component also desirably has a melting point greater than 145° C. In another embodiment, the propylene component has a melting point (Tm) from 130° C. to 180° C., preferably from 140° C. to 170° C.

In another embodiment, the branched polypropylene has a MFR (230° C./2.16 kg weight) from 0.1 to 150 g/10 min, preferably from 0.2 to 40 g/10 min, more preferably from 0.5 to 30 g/10 min, and most preferably from 0.5 to 2 g/10min. All individual values and subranges from 0.1 to 150 g/10 min are included herein and disclosed herein. This component also desirably has a melting point greater than 145° C.

The at least one branched propylene polymer has a melt tan delta equal to or less than 2, preferably equal to or less than 1.75, and more preferably equal to or less than 1.5, as measured by parallel plate rheometer at 0.1 rad/sec, 180° C., and 10 percent strain. Preferably, the ratio of the melt tan delta of the VLDPE to the melt tan delta of the polypropylene component is from 0.1 to 4, preferably from 0.5 to 2.

As here used, "nucleated" refers to a polymer that has been modified by addition of a nucleating agent such as MILLAD, a dibenzyl sorbitol commercially available from Milliken. Other conventional nucleating agents may also be used.

Preparation of the branched polypropylene can involve the use of Ziegler catalysts such as a titanium trichloride in combination with aluminum diethylmonochloride, as described by Cecchin, U.S. Pat. No. 4,177,160, incorporated herein in its entirety by reference. Polymerization processes, used to produce such high melting polymers, include the slurry process, which is run at about 50° C. to 90° C. and 0.5 MPa to 1.5 MPa (5 atmosphere (atm) to 15 atm), and both the gas-phase and liquid-monomer processes in which extra care must be given to the removal of amorphous polymer. An α-olefin copolymer may be added to the reaction to form a block copolymer. The polypropylene may also be prepared by using any of a variety of metallocene, single site and constrained geometry catalysts together with their associated processes.

Suitable branched polypropylene include PROFAX™ branched polypropylenes available from Basell, DAPLOY™ from Borealis and INSPIRE™ from Braskem.

Preferably, the propylene polymer component is present in the elastomer composition of the present invention in an amount equal to or less than 40 weight percent, preferably equal to or less than 30 weight percent based on the total weight of the elastomer composition.

Preferably, the propylene polymer component is present in the elastomer composition of the present invention in an amount equal to or greater than 10 weight percent, preferably equal to or greater than 20 weight percent based on the total weight of the elastomer composition.

In addition, the elastomer composition of the invention advantageously may further comprise at least one additive of the type conventionally added to elastomeric polymer compositions. These additives include, for example, process oils; antioxidants, preferred hindered phenolic antioxidants are IRGANOX™ 1010 and IRGANOX 1076 antioxidants or an organophosphate such as IRGAFOS™ 168 (all available from Ciba-Geigy Corporation); surface tension modifiers; UV stabilizers; scratch/mar additives, such as polydimethyl siloxane (PDMS) or functionalized polydimethyl siloxane or scratch mar formulations containing erucamide; anti-block agents; dispersants; blowing agents; linear or substantially linear ethylene polymers; LDPE; LLDPE; lubricants; cross-linking agents such as peroxides; antimicrobial agents such as organometallics, isothiazolones, organosulfurs and mercaptans; antioxidants such as phenolics, secondary amines, phosphites and thioesters; antistatic agents such as quaternary ammonium compounds, amines, and ethoxylated, propoxylated or glycerol compounds; fillers and reinforcing agents, such as wollastonite, carbon black, glass, metal carbonates such as calcium carbonate, metal sulfates such as calcium sulfate, talc, clay, mica or graphite fibers.

Additional additives include hydrolytic stabilizers; lubricants such as fatty acids, fatty alcohols, esters, fatty amides, metallic stearates, paraffinic and microcrystalline waxes, silicones and orthophosphoric acid esters; mold release agents, such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate; ultraviolet light stabilizers used as a hindered amine, an o-hydroxy-phenylbenzotriazole, a 2-hydroxy, 4-alkoxyenzophenone, a salicylate, a cynoacrylate, a nickel chelate and a benzylidene malonate and oxalanilide; and zeolites, molecular sieves, anti-stat agents and other known deodorizers.

Skilled artisans can readily select any suitable combination of additives and additive amounts, as well as the method of incorporating the additive(s) into the composition, without undue experimentation. Typically, each of the above additives, if used, does not exceed 45 weight percent, based on total composition weight, and are advantageously from about 0.001 to about 20 weight percent, preferably from 0.01 to 15 weight percent and more preferably from 0.1 to 10 weight percent.

The elastomer compositions of this invention can be fabricated into parts, sheets or other article of manufacture, using any conventional extrusion, blow molding, foaming, or thermoforming process. Specific examples of such processes include sheet extrusion, profile extrusion, blow molding, and thermoforming, especially vacuum thermoforming. Such processes can produce articles or products having smooth or embossed surfaces.

The elastomer compositions of the invention can be prepared by combining one or more ethylene/α-olefin (EAO), one or more VLDPE with one or more branched polypropylene. While such compositions can be prepared by any one of a number of different processes, generally these processes fall into one of two categories, that is, post-reactor blending and in-reactor blending. Illustrative of the former are melt extruders into which two or more solid polymers are fed and physically mixed into a substantially homogeneous composition, and multiple solution, slurry or gas phase reactors, arranged in a parallel array, and in which, the output from each is blended with one another to form a substantially homogeneous composition, which is ultimately recovered in solid form. Illustrative of the latter are multiple reactors connected in series, and single reactors charged with two or more catalysts.

Compounding, or melt blending, may take place in the extruder, calenderer, blow molding machine, foaming equipment, or other kind of forming equipment that melt mixes and makes the fabricated article, this is sometimes referred to as in-line compounding. Alternatively, the elastomeric polymer composition of the present invention may be melt blended by conventional extrusion, in which a compound (generally in the form of a pellet) with or without additives, is obtained. The resulting compound (or pellet) is then extruded into a sheet, profile, blow molded article, injection molded article, or thermoform. Additives may be added to the compounding process neat, in other word in their standard state (i.e., as liquid and/or powders), as concentrates, and/or master batches.

The compositions also may be blended with another polymer, prior to fabrication of an article. Such blending may occur by any of a variety of conventional techniques, one of which is dry blending of pellets of the propylene polymer compositions of this invention with pellets of another polymer.

The elastomer compositions of the present invention may also be used in an extrusion blow molding process to form extrusion blow molded articles.

In a preferred embodiment, the elastomer composition of the present invention is used in a process to make an automotive article. One method of manufacturing such an article is to first form, a sheet for example an extruded sheet, optionally an embossed sheet (i.e., a sheet with a textured or "grained" appearance, wherein the texturing may be done in the same (on-line) or different (off-line) step as making the sheet). The sheet preferably has a thickness equal to or greater than 0.5 mm, more preferably equal to or greater than 0.6 mm, and even more preferably equal to or greater than 0.7 mm. The sheet preferably has a thickness equal to or less than 4.0 mm, more preferably equal to or less than 3 mm, and even more preferably equal to or less than 2 mm. The sheet is then shaped by thermoforming, positively thermoforming (sometimes referred to as "male" thermoforming) or preferably negatively thermoforming (sometimes referred to as "female" thermoforming), to the shape of the shaped automotive article, preferably a non-carpeted flooring. The sheet and/or thermoformed flooring is applied to interior vehicle floors. Any thickness that meets the required flooring requirements is acceptable; preferably, the sheet is at least 3 mm in thickness, more preferably 2 mm in thickness.

In another embodiment of the present invention, the elastomer composition may be coextruded with a suitable thermoplastic as a cap layer of an AB sheet (wherein the elastomer composition of the present invention is the A layer) or as tri laminate (e.g., an ABA sheet wherein the elastomer composition of the present invention is the A layers) to provide improved abrasion resistance and lower gloss. The elastomeric composition of the present invention is coextruded onto any thermoplastic suitable for sound and vibration abatement, for example a sound blocking and/or vibration controlling composition comprising one or more of EVA, EPDM, ethylene-alpha olefin copolymer, ethylene-olefin block copolymer, and the like filled with calcium carbonate, barium sulphate, and combinations thereof.

The cap layer (the A layer of an AB sheet and/or the A layer of an ABA sheet) preferably has a thickness equal to or greater than 0.2 mm, more preferably equal to or greater than 0.4 mm, and even more preferably equal to or greater than 0.5 mm. The cap layer preferably has a thickness equal to or less than 2 mm, more preferably equal to or less than 1.5 mm, even more preferably equal to or less than 1mm, and even more preferably equal to or less than 0.8 mm.

Thermoforming is preferably performed at a temperature equal to or less than 220° C., more preferably equal to or less than 200° C., more preferably equal to or less than 190° C., and most preferably equal to or less than 180° C. Thermoforming is preferably performed at a temperature equal to or greater than 130° C., more preferably equal to or greater than 140° C., and more preferably equal to or greater than 150° C. A preferred target temperature for thermoforming a sheet comprising the elastomer composition of the present invention is 160° C.

Melt tan delta is a useful parameter to determine how well suited a particular thermoplastic composition is for thermoforming. Melt tan delta is the ratio of the viscous modulus divided by the elastic modulus (G"/G') as measured on a dynamic mechanical spectrometer in the melt state. If the value is high the sample flows easily and has little melt strength. If the value is low the sample has a lot of elastic memory or stored energy and little ability to flow. Preferably, a thermoplastic composition has enough melt strength to avoid too much sag in the thermoforming oven yet still have some ability to flow as the part is pulled by vacuum around the tool. Materials can have too much melt strength as well as too little. Typically, a suitable melt strength for thermoforming is found when the melt tan delta, for a specific thermoplastic composition at appropriate thermoforming temperature range, is between 1 and 2.

EXAMPLES

Examples 1 to 3 and Comparative Examples A and B are melt blended on a Killion 1.25 inch (in) sheet extruder using a Barrier Screw with a Maddock Mixer and extruded into sheet. All components are tumble blended for 20 minutes prior to being fed into the extruder. Sheet is extruded measuring about 1mm thick and 10 in wide onto a Davis Standard three roll stack having chrome polished steel rolls. The extruder barrel temperatures, from the hopper to the die, are 195° C., 200° C., 210° C., 215° C., and 215° C. with a melt temperature of 240° C. and the roll stack temperatures from top to bottom are 32° C., 32° C., and 23° C.

The composition for Examples 1 to 3 and Comparative Examples A and B are given in Table 1 below in parts by weight based on the total weight of the composition. Unless otherwise noted, molecular weights are absolute molecular weight determined by laser low angle light scattering (LALLS) and Mooney viscosity is determined according to ASTM D 1646. In Table 1:

"EAO-1" is an ethylene/propylene/diene modified interpolymer having 70 weight percent ethylene and 4.9 weight percent 5-ethylidene-2-norbornene with a density of 0.88 g/cc, a Mooney viscosity of 70 ML (1+4) at 125° C., and a MFR of about 0.1 g/10 min at 190° C./2.16 kg available as NORDEL™ 4770P from The Dow Chemical Company;

"EAO-2" is an ethylene/propylene/diene modified interpolymer having 67 weight percent ethylene and 2.2 weight percent 5-ethylidene-2-norbornene with a density of 0.88 g/cc, a Mooney viscosity of 60 ML (1+4) at 125° C. and a MFR of about 0.1 g/10 min at 190° C./2.16 kg available as NORDEL 3760P from The Dow Chemical Company;

"EAO-3" is an ethylene/propylene/diene modified interpolymer having 71 weight percent ethylene and 0.5 weight percent 5-ethylidene-2-norbornene with a density of 0.88 g/cc, a Mooney viscosity of 18 ML (1+4) at 125° C., a weight average molecular weight (Mw) of about 120,000, and a molecular weight distribution of about 0.7 available as NORDEL 3722P from The Dow Chemical Company;

"EAO-4" is an ethylene/propylene/diene modified interpolymer having 70 weight percent ethylene and 0.6 weight percent 5-ethylidene-2-norbornene with a density of 0.867 g/cc, a Mooney viscosity of 20 ML (1+4) at 125° C., a MFR of about 1 g/10 min at 190° C./2.16 kg, a weight average molecular weight (Mw) of about 114,800, a number average molecular weight (Mn) of about 28,350, and a molecular weight distribution (Mw/Mn) of about 4.05 available as NORDEL 3720P from The Dow Chemical Company;

"VLDPE" is a very low density polyethylene produced via gas phase polymerization using a Ziegler Nada catalysis, it is an ethylene-butene copolymer characterized by a MFR (190° C./2.16 kg) of 0.1 g/10 min, a density of 0.884 g/cc, a viscosity, as determined by capillary rheometry at 200° C. and 120 sec$^{-1}$ of 2415 Pa-s, a rheology ratio of 30, and a Shore D hardness of 29: and a weight average molecular weight of 250,000 grams per mole (g/mol) with a z average molecular weight of 920,000 g/mol available as ENGAGE™ HM 7280 from The Dow Chemical Company;

"PP-1" is a branched propylene-ethylene copolymer having 8.5 percent ethylene, with a MFR (230° C./2.16 kg) of 0.5 g/10 min, a density of 0.903 g/cc, and a viscosity, as determined by capillary rheometry at 200° C. and 120 sec$^{-1}$ of 1400 Pa-s, and a weight average molecular weight (Mw) of 430,000 g/mol available as D114 from The Dow Chemical Company;

"PP-2" is a nucleated highly crystalline propylene homopolymer having a number average molecular weight (Mn) of 41,000 g/mol, a weight average Mw of 183,000 g/mol, and a Mn/Mw of about 4.5 available as D114 from The Dow Chemical Company; and "Black" is a black color concentrate comprising carbon black in polypropylene available as K-6807-Q from Americhem.

The following characterizations and tests are performed on Examples 1 to 3 and Comparative Examples A and B:

"Modulus" is 3 point apparent bending modulus determined parallel and perpendicular to the direction of extrusion according to ASTM D747 and reported as MPa;

"60° Gardner Gloss" is determined according to ASTM D523, values reported in percent;

"Taber Abrasion" uses an H-18 wheel at 500 cycles determined according to ASTM D4060; and "Scuff Whitening" is determined according to ASTM D6279 with performance evaluated by a 1 to 5 rating scale, wherein higher scuffing/whitening receives a higher rating.

TABLE 1

| | Comparative Example | | Example | | |
|---|---|---|---|---|---|
| | A | B | 1 | 2 | 3 |
| Composition | | | | | |
| VLDPE | 18.5 | 18.5 | 18.5 | 18.5 | 20 |
| PP-1 | 22 | 22 | 22 | 22 | 30 |
| PP-2 | 8 | 8 | 8 | 8 | |
| EAO-1 | | | | 51.5 | 50 |
| EAO-2 | | | 51.5 | | |
| EAO-3 | | 51.5 | | | |
| EAO-4 | 51.5 | | | | |
| Black | 2.9 | 2.9 | 2.9 | 2.9 | 2.9 |
| Properties | | | | | |
| Modulus, MPa | | | | | |
| Parallel | 77 | 82.4 | 66 | 81.9 | 57 |
| Perpendicular | 126 | 118 | 100 | 111 | 94 |
| 60° Gardner Gloss, % | 2.24 | 1.84 | 1.72 | 1.7 | 1.6 |

TABLE 1-continued

| | Comparative Example | | Example | | |
|---|---|---|---|---|---|
| | A | B | 1 | 2 | 3 |
| Taber Abrasion, g weight loss | 0.094 | 0.097 | 0.101 | 0.105 | 0.110 |
| Scuff Whitening | 4 | 4 | 3 | 3 | 3 |

What is claimed is:

1. An elastomer composition comprising:
    a) an ethylene/α-olefin/diene modified interpolymer having a density of from 0.84 g/cc to 0.92 g/cc and a Mooney viscosity of equal to or greater than 50 ML (1+4) at 125° C. as determined according to ASTM D 1646 in an amount of from 40 to 60 parts by weight;
    b) a very low density ethylene polymer component having a density equal to or less than 0.89 g/cc in an amount of from 10 to 20 parts by weight; and
    c) a propylene polymer component comprises at least one branched polypropylene in an amount of from 20 to 30 parts by weight.

2. The composition of claim 1 wherein the diene of the ethylene/α-olefin/diene modified interpolymer is 5-ethylidene-2-norbornene; 1,4-hexadiene; or 7-methyl-1,6-octadiene.

3. The composition of claim 1 wherein the at least one branched polypropylene is a copolymer of propylene and an α-olefin, selected from ethylene, 1-butene, 1-pentene, 1-hexene, 1-heptene, or 1-octene.

4. The composition of claim 1 wherein the propylene polymer component is a mixture of branched polypropylene and unbranched polypropylene.

5. The composition of claim 3 wherein the branched polypropylene is present in at least 50 weight percent based on the weight of the propylene polymer component.

6. A process to make an automotive non-carpeted flooring comprising the steps of:
    i) forming a sheet comprising an elastomer composition comprising:
        a) an ethylene/α-olefin/diene modified interpolymer having a density of from 0.84 g/cc to 0.92 g/cc and a Mooney viscosity of equal to or greater than 50 ML (1+4) at 125° C. as determined according to ASTM D 1646 in an amount of from 40 to 60 parts by weight;
        b) a very low density ethylene polymer component having a density equal to or less than 0.89 g/cc in an amount of from 10 to 20 parts by weight; and
        c) a propylene polymer component comprises at least one branched polypropylene in an amount of from 20 to 30 parts by weight
    and
    ii) thermoforming the sheet into an automotive non-carpeted flooring.

7. The process of claim 6 wherein the sheet is an AB coextruded sheet or an ABA coextruded sheet wherein the elastomer comprising composition is the A layer(s).

8. Automotive non-carpeted flooring made by the process of claim 6 or 7.

* * * * *